(12) United States Patent
Tsudik et al.

(10) Patent No.: US 9,443,240 B2
(45) Date of Patent: Sep. 13, 2016

(54) TRANSACTION VERIFICATION ON RFID ENABLED PAYMENT AND TRANSACTION INSTRUMENTS

(71) Applicant: The Regents of the University of California, Oakland, CA (US)

(72) Inventors: Gene Tsudik, Irvine, CA (US); Ersin Uzun, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 708 days.

(21) Appl. No.: 13/782,764

(22) Filed: Mar. 1, 2013

(65) Prior Publication Data
US 2013/0179349 A1 Jul. 11, 2013

Related U.S. Application Data

(62) Division of application No. 13/286,154, filed on Oct. 31, 2011, now abandoned.

(60) Provisional application No. 61/411,718, filed on Nov. 9, 2010.

(51) Int. Cl.

| | |
|---|---|
| G06Q 20/32 | (2012.01) |
| G06F 21/34 | (2013.01) |
| G06F 21/36 | (2013.01) |
| G06Q 20/34 | (2012.01) |
| G06Q 20/40 | (2012.01) |
| G07F 7/08 | (2006.01) |
| H04L 9/32 | (2006.01) |
| H04L 29/06 | (2006.01) |
| H04L 9/08 | (2006.01) |
| H04W 12/06 | (2009.01) |

(52) U.S. Cl.
CPC .......... *G06Q 20/3278* (2013.01); *G06F 21/34* (2013.01); *G06F 21/36* (2013.01); *G06Q 20/352* (2013.01); *G06Q 20/40* (2013.01); *G06Q 20/401* (2013.01); *G07F 7/0846* (2013.01); *G07F 7/0853* (2013.01); *G07F 7/0873* (2013.01); *H04L 9/0838* (2013.01); *H04L 9/3226* (2013.01); *H04L 63/0823* (2013.01); *H04L 63/126* (2013.01); *H04W 12/06* (2013.01); *H04L 2209/56* (2013.01); *H04L 2209/805* (2013.01); *H04L 2463/082* (2013.01); *H04L 2463/102* (2013.01); *H04L 2463/121* (2013.01)

(58) Field of Classification Search
USPC .................................................. 705/64; 726/9
See application file for complete search history.

(56) References Cited

U.S. PATENT DOCUMENTS

| | | | | | |
|---|---|---|---|---|---|
| 5,777,903 | A | * | 7/1998 | Piosenka | G06K 19/0704 708/100 |
| 6,834,294 | B1 | * | 12/2004 | Katz | G06F 3/0238 341/22 |
| 7,624,433 | B1 | * | 11/2009 | Clark | G06F 21/335 726/9 |
| 2006/0120616 | A1 | * | 6/2006 | Kita | H04N 1/00204 382/254 |
| 2008/0294902 | A1 | * | 11/2008 | Lu | G06F 21/34 713/176 |
| 2013/0179686 | A1 | * | 7/2013 | Tsudik | H04W 12/06 713/168 |

* cited by examiner

*Primary Examiner* — Tsan-Yu J Huang
(74) *Attorney, Agent, or Firm* — Marcus C. Dawes; Daniel L. Dawes

(57) ABSTRACT

A display enabled RFID tag (DERT) receives transaction details from the reader. DERT verifies that the details match their counterparts in the reader public key certificate. The process is aborted in case of a mismatch. DERT extracts and displays user-verifiable data. It then enters a countdown stage that lasts for a predetermined duration. A user observes the transaction information and, if the transaction amount and other details are deemed correct, presses an accept button provided on the DERT before the timer runs out. DERT signs the time-stamped transaction statement and sends it to the reader. This signed statement is then sent to the payment gateway and eventually to the financial institution that issued the payment DERT.

3 Claims, 4 Drawing Sheets

TRANSACTION VERIFICATION ON RFID ENABLED PAYMENT AND TRANSACTION INSTRUMENTS

STATEMENT OF GOVERNMENT SUPPORT

This invention was made with government support under grant 0831526 awarded by the National Science Foundation. The government has certain rights in the invention.

RELATED APPLICATIONS

The present application is related to U.S. patent application Ser. No. 13/286,154, filed on Oct. 31, 2011, which is incorporated herein by reference and to which priority is claimed pursuant to 35 USC 120.

BACKGROUND

1. Field of the Technology

The disclosure relates to the field of methods of using RFID tags in secure transactions and communications.

2. Description of the Prior Art

Recent emergence of RFID tags capable of performing public key operations has enabled some new applications in commerce (e.g., RFID-enabled credit cards) and security (e.g., ePassports and access control badges). While the use of public key cryptography in RFID tags mitigates many difficult security issues, certain important usability-related issues remain, particularly, when RFID tags are used for financial transactions or bearer identification. What is need is some kind of user-involved techniques for secure user-to-tag authentication, transaction verification, reader expiration & revocation checking, as well as association of RFID tags with other personal devices.

Radio Frequency Identification (RFID) is a wireless technology mainly used for identification of various types of objects, e.g. merchandize. An RFID tag is a purely passive device—it has no power source of its own. Information stored on an RFID tag can be read by a special device called an RFID reader, from some distance away and without requiring line-of-sight alignment (in contrast to barcodes). Although RFID technology was initially envisaged as a replacement for barcodes in supply chain and inventory management, its many advantages have greatly broadened the scope of possible applications. Current and emerging applications range from visible and personal (e.g., toll transponders, passports, credit cards, access badges, livestock/pet tracking devices) to stealthy tags in merchandize (e.g., clothes, pharmaceuticals and books/periodicals).

The costs and capabilities of RFID tags vary widely depending on the target application. At the high end of the spectrum are the tags used in e-Passports, electronic ID (e-ID) Cards, e-Licenses, and contactless payment instruments. Such applications involve relatively sophisticated tags each costing a few dollars. Even though they are powerful enough to perform sophisticated public key cryptographic operations, there remain security and privacy issues when these tags are used as a means of payment or owner/bearer identification.

User authentication is a fundamental problem that has received a great deal of attention in the security community, for several decades. Solutions range from simple modifications to the standard PIN/password entry techniques to schemes that require more complicated cognitive tasks from users. Authentication of users to passive devices (such as RFID tags) is a very recent issue. The first solution was proposed by Czeckis, et al. In it, users authenticate to an accelerometer-equipped RFID tag by moving or shaking it (or the wallet containing it) in a certain pattern. However, this method assumes that RFID tags are equipped with an accelerometer, and requires users to memorize movement patterns. Also, it is prone to passive observer attacks.

A similar technique called "PIN-Vibra" was suggested by Saxena, et al. for authenticating to an accelerometer-equipped RFID tags using a mobile phone. In it, a vibrating mobile phone is used to lock or unlock RFID tags. While the usability of PIN-Vibra seems promising, it has a some drawbacks: (1) high error rates—accelerometers on tags cannot perfectly decode PINs encoded in phone vibrations, (2) user's phone must be present and functional (e.g., not out of battery) whenever the tag has to be used, and (3) accelerometer-equipped RFID tags are relatively expensive and do not lend themselves to other applications that would help amortize their cost.

Current literature and systems that address the transaction verification and amount fraud problem use data mining, machine learning techniques, and out-of-band communication; most banks verify transactions via alternate communication mediums such as email or telephone. A complete survey of modern fraud detection techniques for Card Present (a.k.a, off-line) and Card not Present (a.k.a, on-line) transactions is due to Kou, et al.

Three popular prior art methods to verify the status of a public key certificate (PKC) are: Certificate Revocation Lists (CRLs), Online Certificate Status Protocol (OCSP) and Certificate Revocation System (CRS).

CRLs are signed lists of revoked certificates periodically published by certification or revocation authorities (CAs or RAs). Usage of CRLs is problematic in RFID systems as they require the tag to have a clock in order to determine whether a given CRL is sufficiently recent. The communication overhead can be quite high if the number of revoked entities is large.

OCSP is an online revocation checking method that reduces storage requirements for all parties involved, while providing timely revocation status information. Although well suited for large connected networks, it is a poor fit for RFID systems as it requires constant connectivity between readers and OCSP responders. Furthermore, the need for a two-round challenge-response protocol with OCSP responders may make it susceptible to adverse effects of network congestion and slow turnaround times.

CRS offers implicit, efficient, and compact proofs of certificate revocation. However, it is unworkable in the RFID context as it also requires verifiers (RFID tags) to have a clock. Despite much prior work in RFID security and certificate revocation, coupled with the fact that the problem had been spotted by researchers, little has been done to address reader PKC revocation and expiration checking problems. Only very recently, Nithyanand, et al. proposed a method that entails user involvement and DERT-s to determine PKC validity. Although this prior work includes a preliminary usability study, it used a mock-up implementation of DERT-s on mobile phones.

A number of device security association/pairing methods have been proposed over the last several years. They use various out-of-band (OOB) channels in the process of secure connection establishment, and as a result, yield different usability characteristics. However, because of the nature of very basic displays that can be integrated into RFID tags, only visual text-based methods are appropriate for DERT-s.

BRIEF SUMMARY

The development of the illustrated embodiment is based on two factors: (1) recent advances in hardware and manufacturing have made it possible to mass-produce inexpensive passive display-equipped RFID tags, and (2) high-end RFID tags used in financial transactions or identification are usually attended by a human user (owner). Our techniques rely on user involvement coupled with on-tag displays to achieve security. User acceptance is a crucial factor in this context.

RFID tags are commonly used as payment and transaction instruments (e.g., credit, debit, ATM and voting cards). In such settings, a reader can easily be maliciously used to mislead the tag into signing or authorizing a transaction different from the one that is communicated to, or intended by, the user. This is possible because there is no direct channel from a tag to its user (i.e., no secure user interface) on regular RFID tags and the only information a user gets (e.g., a receipt, or an amount displayed on the cash register) is under the control of a potentially malicious reader. Thus, it seems impossible for a user to verify (in real time) transaction details, e.g., the amount or the currency. This problem becomes especially important with current electronic credit cards.

The problem of malicious RFID readers and the more specific problem of transaction fraud has been largely ignored. Currently, receipts produced by readers (or devices that they are attached to) are the only verification proof users get at the time of transaction. However, as mentioned earlier this doesn't solve problem and arguably make it even worse by triggering false sense of trust.

In the case of credit cards, users usually get monthly statements or given access to online statements that list recent transactions. However, small amount frauds are very easy to miss on those statements since this information is available at least few days or more after the transaction and it is hard for users to remember and verify all those transactions listed on a statement.

Our approach to transaction amount verification is designed to work with any RFID-enabled payment instrument. Its primary goal is to provide simple, secure and usable transaction verification at a point-of-sale (PoS).

The Protocol
1. Display enabled RFID tag (DERT) receives transaction details from the reader (seller/merchant).
2. DERT verifies that the details (e.g., issuing bank, account number, etc.) match their counterparts in the reader public key certificate (PKC). Protocol is aborted in case of a mismatch.
3. DERT extracts and displays user-verifiable data, i.e., the amount and, optionally, the currency code. It then enters a countdown stage that lasts for a predetermined duration (e.g., 10 seconds).
4. User observes transaction information and, if the transaction amount and other details are deemed correct, presses an accept button provided on the DERT before the timer runs out. At this point, DERT signs the time-stamped transaction statement and sends it to the reader. This signed statement is then sent to the payment gateway and eventually to the financial institution that issued the payment DERT.

However, if the user decides that transaction details are incorrect, the timer runs out (or the user presses the reject button, if one is available), the DERT automatically aborts the protocol.

Thus, what is disclosed is a method that allows users to verify the transaction details (e.g., the amount being charged) and explicitly approve them on RFID enabled payment and transaction instruments.

This solution takes a proactive approach (instead of reacting to fraudulent transactions after they occur) and doesn't allow any transactions to go through without user's approval of its details (e.g., the amount for a credit card transaction). It is also important that users verify transaction details at the time of the transaction in our solution (not few days later).

The illustrated embodiment can be used in many domains especially with RFID enabled payment instruments. Banks, credit card companies and companies producing equipment for RFID based voting systems will find the method useful.

More particularly, the illustrated embodiment includes a method for securing the communication of a wireless, interface-constrained device with a reader including the steps of: providing the wireless, interface-constrained device with a passive display, where the wireless, interface-constrained device is capable of generating a random number and is characterized by a personal identification number (PIN) having a predetermined number of numbers; generating the random number with the same length as the PIN; displaying the random number with the wireless, interface-constrained device; using a reader keypad to change the displayed random number on the wireless, interface-constrained device to the PIN; and performing a matching algorithm in the wireless, interface-constrained device, so that if the PIN was entered correctly, the wireless, interface-constrained device unlocks itself for communication with the reader, otherwise the wireless, interface-constrained device remains locked. By reason of this method a reliable user-to-tag authentication is performed using an RFID with constrained inputs.

The method further includes the step of masking all numbers displayed on the wireless, interface-constrained device except the one currently being modified to reduce vulnerability to spying.

In another embodiment the illustrated embodiment includes a method for securing the communication of a wireless, interface-constrained device with a reader including the steps of: providing the wireless, interface-constrained device with a timer, passive display and a user-controlled input; receiving transaction details in the wireless, interface-constrained device from the reader; verifying that the transaction details match their counterparts in the reader PKC, otherwise aborting communication in case of a mismatch; extracting and displaying selected user-verifiable data relating to the transaction; initiating a countdown for a predetermined duration; observing the selected extracted and displayed transaction information by a user and, if the selected extracted and displayed transaction information is deemed correct by the user, activating the user-controlled input before the countdown ends; aborting communication with the reader if the user deems that the selected extracted and displayed transaction information is incorrect, or if the countdown ends; detecting activation of the user-controlled input; automatically authorizing a time-stamped transaction statement to be sent to the reader if communication with the reader is allowed by the user; and completing the transaction through the reader if authorized. As a result a reliable transaction verification is performed in an RFID tag with constrained inputs.

In another embodiment the illustrated embodiment includes a method for securing the communication of a wireless, interface-constrained device with a reader including the steps of: providing the wireless, interface-constrained device with a timer, passive display and a user-controlled input; receiving in the wireless, interface-constrained device a Certificate Revocation List (CRL) and the reader's Public Key Certificate (PKC) from the reader;

if either CRLexp or PKCexp, where CRLexp and PKCexp are the expiration times of CRL and PKC, respectively, is smaller than Tagcurr, the last valid time-stamp encountered by the wireless, interface-constrained device, or if CRLiss≥PKCexp, where CRLiss is the issuance time of the CRL, aborting the communication with the reader; determining in the wireless, interface-constrained device whether the CRL from the reader includes the serial number of the reader certificate and if so, aborting the communication with the reader; checking in the wireless, interface-constrained device the Certificate Authority (CA) signatures of the PKC and CRL from the reader, and if either check fails, aborting the communication with the reader; If CRLiss or PKCiss is more recent than the currently stored date in the wireless, interface-constrained device, where PKCiss is the issuance time of the PKC, updating the stored date stored in the wireless, interface-constrained device to the more recent of CRLiss and PKCiss; displaying the lesser of CRLexp and PKCexp in the wireless, interface-constrained device and entering a countdown of fixed duration; deciding by means of user discernment whether the displayed time-stamp, namely the lesser of CRLexp and PKCexp, is in the future, and if so, activating the user-controlled input before the countdown ends; detecting activation of the user-controlled input; and allowing communication with the reader, otherwise automatically aborting communication with the reader if activation of the user-controlled input is not detected before the countdown ends or if the user otherwise activates a user-controlled rejection input.

In another embodiment the illustrated embodiment includes a method for securing the communication of a wireless, interface-constrained device including the steps of: providing the wireless, interface-constrained device with a passive display and capability of generating a random pass code for device pairing and running a secret based key agreement protocol; generating and displaying a pass code in wireless, interface-constrained device; prompting a user of a paired device to enter the pass code; and using the pass code to perform an authenticated key agreement protocol to establish a common key between the wireless, interface-constrained device and paired device and to confirm its possession by both the wireless, interface-constrained device and the paired device.

In another embodiment the illustrated embodiment includes a wireless, interface-constrained device adapted to communicate with a reader with a reader keypad including: a passive display; a random number generator; a memory for a personal identification number (PIN) having a predetermined number of numbers, the random number with the same length as the PIN; a circuit for communicating with the reader so that the displayed random number on the wireless, interface-constrained device can be changed to the PIN by use of the reader keypad; and a processor coupled to the display, random number generator, memory and circuit for communicating. The processor is provided for performing a matching algorithm, so that if the PIN is entered correctly, the wireless, interface-constrained device unlocks itself for further communication with the reader, otherwise the wireless, interface-constrained device remains locked. As a result a reliable user-to-tag authentication is performed in an RFID tag with constrained inputs.

In a further embodiment the processor is arranged and configured to mask all numbers displayed on the display except the one currently being modified to reduce vulnerability to spying.

In another embodiment the illustrated embodiment includes a wireless, interface-constrained device for securing communication with a reader with a Public Key Certificate (PKC) including: a timer; a passive display; a user-controlled input; a circuit for communicating with the reader for receiving transaction details from the reader; and a processor coupled to the timer, display, user-controlled input and the circuit for communicating. The processor is provided for verifying that the transaction details match their counterparts in the reader Public Key Certificate (PKC), otherwise aborting communication in case of a mismatch, for extracting and displaying selected user-verifiable data relating to the transaction. The timer initiates a countdown for a predetermined duration during which time a user observes the selected extracted and displayed transaction information and, if the selected extracted and displayed transaction information is deemed correct by the user, activates the user-controlled input before the countdown ends. The processor detects activation of the user-controlled input, aborts communication with the reader if the user deems that the selected extracted and displayed transaction information is incorrect, or if the countdown ends, otherwise the processor automatically authorizes a time-stamped transaction statement to be sent to the reader if communication with the reader is allowed by the user, and completes the transaction through the reader if authorized. As a result a reliable transaction verification is performed in an RFID tag with constrained inputs.

In another embodiment the illustrated embodiment includes a wireless, interface-constrained device for securing the communication with a reader including: a timer; a passive display; a user-controlled input; a circuit for communicating with the reader for receiving a Certificate Revocation List (CRL) and the reader's Public Key Certificate (PKC) from the reader; and a processor coupled to the timer, display, user-controlled input and the circuit for communicating. The processor is provided for aborting communication with the reader, if either CRLexp or PKCexp, where CRLexp and PKCexp are the expiration times of CRL and PKC, respectively, is smaller than Tagcurr, the last valid time-stamp encountered by the wireless, interface-constrained device, or if CRLiss≥PKCexp, where CRLiss is the issuance time of the CRL, for determining whether the CRL from the reader includes the serial number of the reader certificate and if so, aborting the communication with the reader, for checking the Certificate Authority (CA) signatures of the PKC and CRL from the reader, and if either check fails aborting the communication with the reader, for updating a stored date to a more recent of CRLiss and PKCiss, if CRLiss or PKCiss is more recent than the currently stored date, where PKCiss is the issuance time of the PKC, for displaying the lesser of CRLexp and PKCexp in the display and initiating a countdown by the timer of fixed duration. A user decides whether the displayed time-stamp, namely the lesser of CRLexp and PKCexp, is in the future, and if so activates the user-controlled input before the countdown by the timer ends. The processor detects activation of the user-controlled input and allows communication with the reader, otherwise automatically aborts communication with the reader if activation of the user-controlled input is not detected before the countdown by the timer ends.

An embodiment of the device further includes a user-controlled rejection input and where the processor aborts communication with the reader if the user activates the user-controlled rejection input.

In another embodiment the illustrated embodiment includes wireless, interface-constrained device adapted for communication with a paired device including: a passive display; a memory for storing a random pass code for device pairing; a circuit for communicating with the paired device; and a processor coupled to the display, the memory and the circuit for communicating. The processor is provided for running a secret based key agreement protocol, for generating and displaying a pass code in the display, for sending a prompt to a user of the paired device to enter the pass code, and for using the pass code to perform an authenticated key agreement protocol to establish a common key with paired device and to confirm possession of the pass code by both the wireless, interface-constrained device and the paired device.

The various embodiments may be combined one with the other in every possible logical combination to provide an RFID tag having the characteristics of the correspondingly combined embodiments.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

Figure 1:
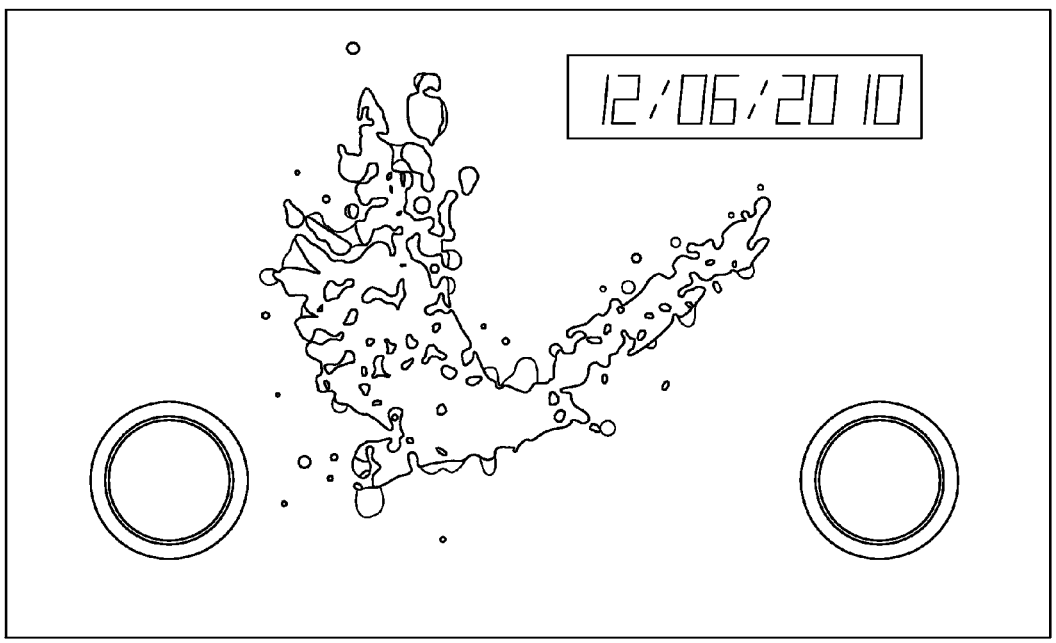
FIG. 1 is a prior art NXP Display-Equipped RFID Tag (DERT) with two buttons.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

In this disclosure, we address four primary issues: user-to-tag authentication, transaction verification, reader revocation and expiration, and secure pairing of RFID tags.

User-to-Tag Authentication:

In many use cases of RFID-based electronic payment and identification documents, authentication of the user to the tag 12 before disclosing any information is necessary to prevent leaks of valuable or private information. Current systems require trust in readers 10 for the purpose of authentication. For example, users must enter PIN-s into ATMs or Point-of-Sale (POS) terminals to authenticate themselves to the RFID tag 12 embedded into their ATM or credit card. However, this leaves users vulnerable to attacks, since secret PINs are being disclosed to third party readers 10, that are easy to hack and modify.

Transaction Verification:

RFID tags 12 are commonly used as payment and transaction instruments (e.g., credit, debit, ATM and voting cards). In such settings, a malicious reader 10 can easily mislead the tag 12 into signing or authorizing a transaction different from the one that is communicated to, or intended by, the user. This is possible because there is no direct channel from a tag 12 to its user (i.e., no secure user interface) on regular RFID tags 12 and the only information a user gets (e.g., a receipt, or an amount displayed on the cash register) is under the control of a potentially malicious reader 10. Thus, it seems impossible for a user to verify (in real time) transaction details, e.g., the amount or the currency. This problem becomes especially important with current electronic credit cards.

Reader Revocation and Expiration:

Any certificate-based Public Key Infrastructure (PKI) needs an effective expiration and revocation mechanism. Intuitively, certificate revocation in RFID systems should concern two entities: RFID tags 12 and RFID readers 10. The former only becomes relevant if each tag 12 has a "public key identity" and we claim that revocation of RFID tags 12 is a non-issue, since, once a tag 12 identifies itself to a reader 10, the latter can use any current revocation status checking method. In contrast, expiration and revocation of reader certificates is a challenging problem in any public key-enabled RFID system. This is because RFID tags 12, being powerless passive devices, cannot maintain a clock. In other words, an RFID tag 12 (on its own) has no means of verifying whether a given certificate has expired or whether any revocation information is recent.

Secure Pairing of RFID Tags:

Current high-end RFID tag 12 cannot establish a secure ad-hoc communication channel to another device, unless the latter is part of the same RFID infrastructure (i.e., an authorized reader 10). Establishing such a channel might be important as it would give tag 12 owner the ability to manage its tag 12. Previously proposed secure device pairing solutions require an auxiliary communication channel to authenticate devices and establish a secure communication channel. However, until now, RFID tags 12 lacked any human interfaces and thus could not be paired with other devices using current methods. Display-equipped RFID tags 12 open a new chapter in RFID security and give users more control over their tags 12, e.g., using an NFC-capable personal device (such as a smart-phone), a user can change settings on a personal RFID tag 12.

The gist of the illustrated embodiment involves taking advantage of recently developed technology that allows high-end RFID tags 12 to be equipped with a small passive display. We refer to such tags 12 as Display-Equipped RFID Tags 12 or DERT-s.

As shown in the rest of this disclosure, carefully designed user interaction with personal DERT-s can yield solutions to aforementioned problems. We present several simple techniques and conduct a thorough study to assess their usability factors. One of the key motivating factors for our work is the fact that DERT-s, such as the one manufactured by NXP Semiconductors (shown in FIG. 1), are already being produced and are available on the market. Moreover, they cost only a few dollars (or Euros) more than their display-less counterparts.

In this disclosure, we use DERT-s to design a very simple solution that permits user-aided verification and fully mitigates amount (and currency) fraud for Card Present transactions. To the best of our knowledge, this is the first work that offers a real solution and provides a comprehensive analysis of its usability. The secure user-to-tag authentication solution described and tested in this disclosure is to be compared to that of Abadi, et al.'s proposal for authentication on smartcards, where a displayed random number is modified by a user to match a PIN.

In this disclosure, we adopt a copy pairing technique, one device chooses a passkey and displays it to the user and the user is asked to type the displayed value into the second device. The devices automatically run a shared secret authentication protocol which succeeds or fails depending on the user's ability to copy the passkey correctly into the second device and depending on the presence of an active attacker.

All methods described below share the following general assumptions: 1. Tags 12 are owned and operated by individuals (users/owners) who understand their roles in each context. 2. Tags 12 are powerful enough to perform public key operations (at least signature verification). 3. Tags 12 are equipped with a one-line alpha-numeric display (OLED or eDisclosure) capable of showing at least 8 characters. 4. Tags 12 can maintain simple counters or timers while powered by a reader 10. 5. Each tag 12 has a programmable button. These parameters are not intended to restrict the scope of the invention, but only to provide a context in which the illustrated embodiment can be understood. Many other and different parameters values and features can be adopted in the claimed invention without departing from its scope and spirit.

Consider first user-to-tag authentication. The illustrated user authentication method is designed for DERT-s but can be used on any wireless, interface-constrained device. We make three additional assumptions: —Tags 12 are capable of generating short (i.e., 4-6 decimal digits) random numbers. —Users have access to a possibly untrusted keypad (or keyboard) with cursor keys. The keypad can be part of (or be connected to) the reader 10. —Tags 12 always clear and reset their displays after authentication completes. We use NXP tags 12 with two buttons in our usability tests, however, one of the button actions can be always substituted with a timeout.

Figure 2:
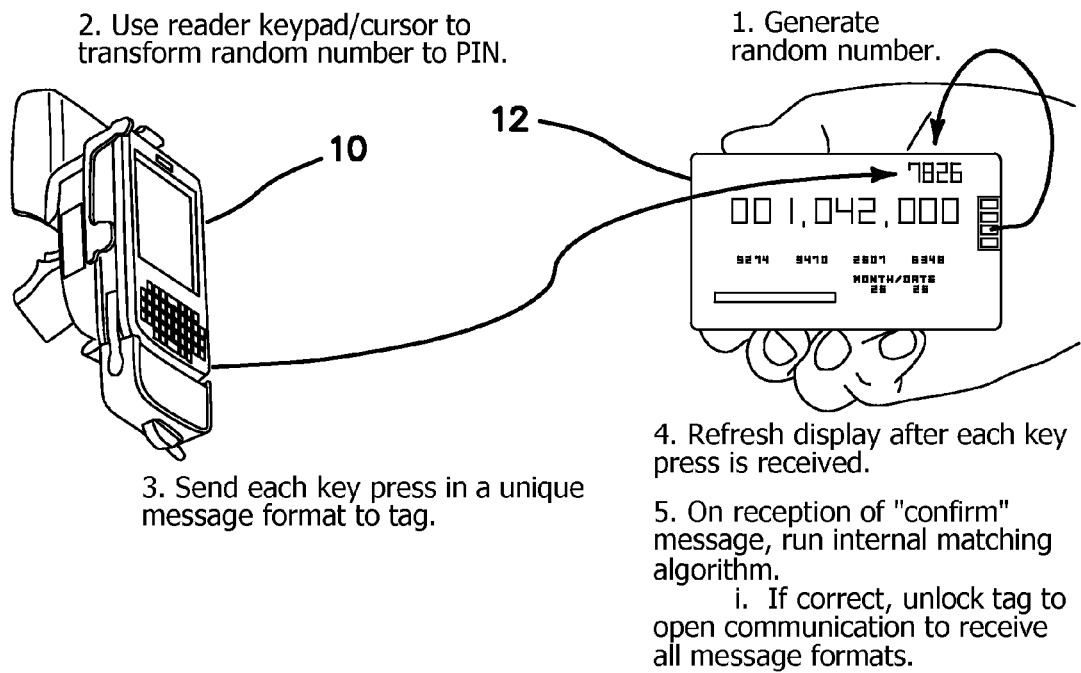
FIG. 2 is a diagram illustrating a secure DERT to user authentication protocol.

Turn now to the utilized protocol in the illustrated embodiment as depicted in the diagram of FIG. 2. In order to unlock a tag 12 for a transaction (e.g., a credit card at a store, a cash card at an ATM, or an e-passport at a hotel), the user needs to be authenticated by proving knowledge of a secret, such as a PIN. The following method allows user-to-tag authentication without requiring any buttons/keys on the tag 12. Moreover, the PIN is protected from potentially malicious (and certainly untrusted) readers 10.

Step 1. Powered by the reader 10, DERT generates a one-time random number of the same length as the PIN. DERT proceeds to display this random number.

Step 2. User operates the cursor keys (↑ ↓ ← →) on the reader keypad to basically change this random number on the DERT into his/her PIN. This is done digit by digit. For example, if the random number displayed by DERT is "5723" and the users PIN is "1296", the necessary sequence of key presses namely: 1) press ↓ 4 times to change 5 to 1, press → once to go to the next digit; 2) press ↓ 5 times to change 7 to 2, press → once to go to the next digit; 3) press ↑ 7 times to change 2 to 9, press → once to go to the next digit; and 4) press ↑ 3 times to change 3 to 6, followed by Confirm. For each user key-press, the reader 10 sends a corresponding message to the tag 12 detailing the key-press, thereby prompting the tag 12 to update its display.

Step 3. On each key press send a unique message to the tag 12 from reader 10.

Step. 4. Refresh the tag display after each key press message is received.

Step 5. Upon receipt of the Confirm message, run an internal matching algorithm in tag 12. If the PIN was entered correctly, DERT unlocks itself for a transaction to receive all message formats. Otherwise tag 12 remains locked.

Note that this method's security is based on several factors. The first is our assumption about the DERT's ability to generate quality, true or nearly true random numbers. The second security requirement is that the user must alternate ↑ and ↓ movements between digits. In other words, if only ↓ key is used for small, i.e., <"5", PIN digits (instead of sometimes going past "9" to reach it), or vice versa for large digits; such a pattern may leak information about the PIN in the long run after repetitive executions of the protocol with a given PIN with the same reader 10. If there is a concern about such leaks, they can easily be prevented by allowing only one of ↓ or ↑ keys to be used when modifying the digits.

Consider now what is a called a shoulder surfing-resistant variant of the protocol. A shoulder surfing attack involves the adversary somehow observing user's actions to obtain critical information (e.g., PIN entered into an ATM). Such attacks techniques range from simply looking over the users shoulder, or using a camera to observe the victim. They are simple to launch and effective in public areas where large crowds or long queues are likely to occur. By applying a simple modification of masking all digits except the one being modified, it is easy to make the above listed protocol shoulder surfing-resistant. (It does not become shoulder surfing-proof, however). We tested both flavors of this protocol and using the letter 'n' as the masking character.

Figure 3:
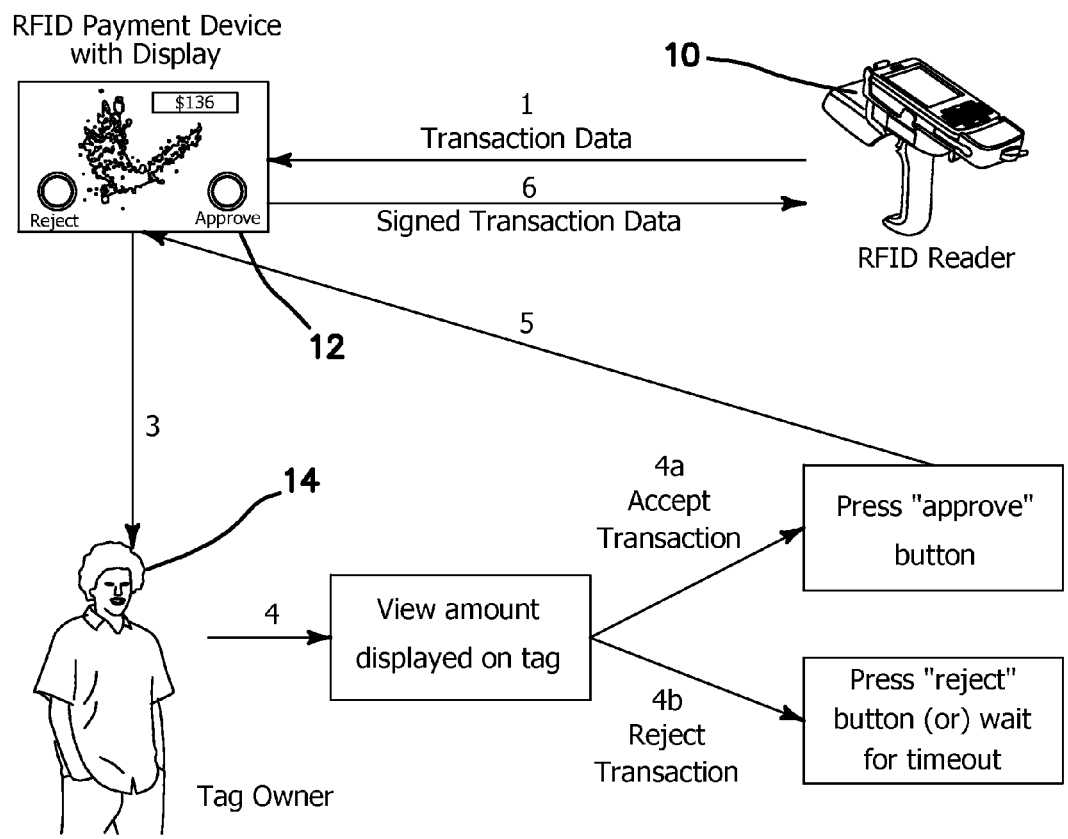
FIG. 3 is a diagram illustrating the DERT enabled transaction verification protocol.

Turn to the issue of transaction verification of FIG. 3. In the illustrated embodiment transaction amount verification is designed to work with any RFID enabled payment instrument. Its primary goal is to provide simple, secure and usable transaction verification at a Point-of-Sale (PoS). The following additional assumption is necessary: —The user has access to either printed or digital (e.g., displayed on the cash register) receipt for the transactions to be verified.

The transaction verification protocol in FIG. 3 is as follows:

Step 1. DERT 12 receives transaction details from the reader 10 (seller/merchant).

Step 2. DERT 12 verifies that the details (e.g., issuing bank, account number, etc.) match their counterparts in the reader PKC. The protocol is aborted in case of a mismatch.

Step 3. DERT 12 extracts and displays user-verifiable data, i.e., the amount and, optionally, the currency code. It then enters a countdown stage that lasts for a predetermined duration (e.g., 10 seconds).

Step 4. The user observes transaction information and, if the transaction amount and other details are deemed correct, in step 4a presses accept button on DERT 12 before the timer runs out. However, if the user decides that transaction details are incorrect, the timer runs out (or the user presses the reject button, if one is available) and DERT 12 automatically aborts the protocol at step 4b.

Step 5. If there is acceptance the activation of the accept button is detected.

Step 6. DERT 12 signs the time-stamped transaction statement and sends it to the reader 10. This signed statement is then sent to the payment gateway and eventually to the financial institution that issued the payment DERT 12.

Figure 4:
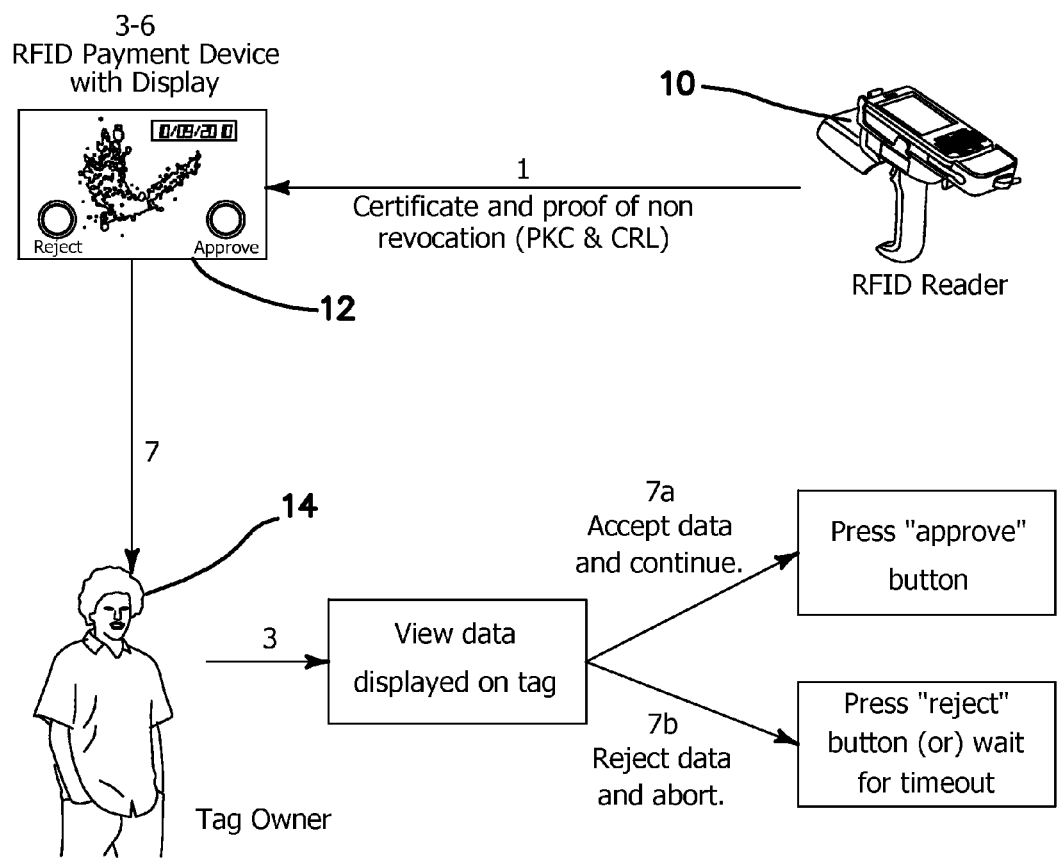
FIG. 4 is a diagram illustrating the reader certificate expiration or revocation verification protocol.

Consider reader revocation status checking of FIG. 4. In the illustrated embodiment reader certificate expiration and revocation checking is aimed at personal RFID tags 12—such as ePassports, e-licences or credit/debit cards—when used in places where trust is not implicit. For example, trust in readers 10 might be implicit in international airports (immigration halls) or official border crossings. Whereas, it is not implicit in many other locations, such as car rental agencies, hotels, flea-markets or duty-free shops. This approach entails the following additional assumptions: —Tags 12 are aware of the identity and public key of the system-wide trusted Certificate Authority (CA). In other words, all tags and readers are subsumed by a system-wide Public Key Infrastructure (PKI). —The CA is assumed to be infallible: anything signed by the CA is guaranteed to be genuine and error-free. —The CA periodically (at fixed intervals) issues an updated revocation structure, such as a CRL. —All tags 12 are aware of the periodicity of issuance of the revocation information and thus can determine expiration time of the revocation structure by simply consulting its issuance time-stamp. —A tag 12 can retain (in local non-volatile storage) the last valid time-stamp it has encountered. Note that our usage of the term "time-stamp" is not restricted to time, i.e., hours and minutes. It is meant to express (at appropriate granularity) issuance and expiration of both certificates (PKCs) and revocation information.

Turn now to the reader revocation status checking protocol. Before providing any information to the reader 10, a tag 12 has to validate the reader's certificate (PKC). The verification process is as illustrated in FIG. 4.

Step 1. Freshly powered-up DERT 12 receives the Certificate Revocation List (CRL) and the reader's Public Key Certificate (PKC) from reader 10. Let CRLiss, CRLexp, PKCiss and PKCexp denote issuance and expiration times of CRL and PKC, respectively. The last encountered valid time-stamp kept by DERT 12 is denoted as TagCurr.

Step 2. If either CRLexp or PKCexp is smaller than Tagcurr, or CRLiss≥PKCexp, DERT 12 aborts.

Step 3. DERT 12 checks whether CRL includes the serial number of the reader certificate. If so, it aborts.

Step 4. DERT 12 checks the CA signatures of PKC and CRL. If either check fails, DERT 12 aborts.

Step 5. If CRLiss or PKCiss is more recent than the currently stored date, DERT 12 updates it to the more recent of the two.

Step 6. DERT 12 displays the lesser of: CRLexp and PKCexp. It then enters a countdown stage of fixed duration (e.g., 10 seconds).

Step 7. The user 14 decides whether the displayed timestamp is in the future. If so, the user 14 presses DERT 12 accept button before the timer runs out, activation is detected and communication with the reader 10 continues at step 7a. Otherwise, the user 14 does nothing: the timer runs out and DERT 12 automatically aborts the protocol or user 14 explicitly rejects reader 10, if a reject button is available at step 7b and the protocol aborts.

Note that we use the term CRL above to denote a generic revocation structure. In fact, the most appropriate (constant-length) revocation structure for DERT 12 applications is the so-called "mini-CRL". In this disclosure, we remain agnostic in this respect since revocation structure details are not germane to usability.

Consider now secure device pairing. Our protocol for bootstrapping a secure communication channel between (i.e., pairing) DERTs 12 and more powerful computing devices—such as laptops or cell-phones—is based on the "Copy" pairing technique described above. This technique entails the following additional assumption: —DERT 12 can generate short random pass codes for the purpose of device pairing and can run secret based key agreement protocols.

The secure device pairing protocol is illustrated as follows.

1. DERT 12 generates and displays a sufficiently long, e.g., 6-9 digit, pass code (in decimal).

2. The software interface on the other device prompts the user 14 to enter this pass code.

3. Using the (presumably common) pass code, DERT 12 and the second device run an authenticated key agreement protocol to establish a (stronger) common key and confirm its possession by both parties.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

We claim:

1. A method for securing the communication of a wireless, interface-constrained device with a reader comprising:
providing the wireless, interface-constrained device with a passive display, where the wireless, interface-constrained device is capable of generating a random number and is characterized by a personal identification number (PIN) having a predetermined number of numbers;
generating a random number with the same length as the PIN;
displaying the random number with the wireless, interface-constrained device;

using a reader keypad to change the displayed random number on the wireless, interface-constrained device to the PIN;

performing a matching algorithm in the wireless, interface-constrained device, so that if the PIN was entered correctly, the wireless, interface-constrained device unlocks itself for communication with the reader, otherwise the wireless, interface-constrained device remains locked, whereby user-to-tag authentication is performed;

providing the wireless, interface-constrained device with a timer, and a user-controlled input;

receiving in the wireless, interface-constrained device a Certificate Revocation List (CRL) and the reader's Public Key Certificate (PKC) from the reader;

if either CRLexp or PKCexp, where CRLexp and PKCexp are the expiration times of CRL and PKC, respectively, is smaller than Tagcurr, the last valid time-stamp encountered by the wireless, interface-constrained device, or if CRLiss PKCexp, where CRLiss is the issuance time of the CRL, aborting the communication with the reader;

determining in the wireless, interface-constrained device whether the CRL from the reader includes the serial number of the reader certificate and if so, aborting the communication with the reader;

checking in the wireless, interface-constrained device the Certificate Authority (CA) signatures of the PKC and CRL from the reader, and if either check fails, aborting the communication with the reader;

If CRLiss or PKCiss is more recent than the currently stored date in the wireless, interface-constrained device, where PKCiss is the issuance time of the PKC, updating the stored date stored in the wireless, interface-constrained device to the more recent of CRLiss and PKCiss;

displaying the lesser of CRLexp and PKCexp in the wireless, interface-constrained device and entering a countdown of fixed duration;

deciding by means of user discernment whether the displayed time-stamp, namely the lesser of CRLexp and PKCexp, is in the future, and if so, activating the user-controlled input before the countdown ends;

detecting activation of the user-controlled input; and allowing communication with the reader, otherwise automatically aborting communication with the reader if activation of the user-controlled input is not detected before the countdown ends or if the user otherwise activates a user-controlled rejection input.

2. A wireless, interface-constrained device adapted to communicate with a reader with a reader keypad comprising:

a passive display;

a random number generator;

a memory for storing a personal identification number (PIN) having a predetermined number of numbers and a random number with the same length as the PIN;

a circuit for communicating with the reader so that the displayed random number on the wireless, interface-constrained device can be changed to the PIN by use of the reader keypad;

a processor coupled to the display, random number generator, memory and circuit for communicating, the processor for performing a matching algorithm, so that if the PIN is entered correctly, the wireless, interface-constrained device unlocks itself for further communication with the reader, otherwise the wireless, interface-constrained device remains locked, whereby user-to-tag authentication is performed;

a timer; and a user-controlled input;

where the circuit for communicating with the reader receives a Certificate Revocation List (CRL) and the reader's Public Key Certificate (PKC) from the reader, where the processor is coupled to the timer, display, user-controlled input and the circuit for communicating, where the processor aborts communication with the reader if either CRLexp or PKCexp, where CRLexp and PKCexp are the expiration times of CRL and PKC, respectively, is smaller than Tagcurr, the last valid time-stamp encountered by the wireless interface-constrained device, or if CRLiss≥PKCexp, where CRLiss is the issuance time of the CRL, where the processor determines whether the CRL from the reader includes the serial number of the reader certificate and if so, aborts the communication with the reader, where the processor checks the Certificate Authority (CA) signatures of the PKC and CRL from the reader, and if either check fails aborts the communication with the reader, where the processor updates a stored date to a more recent of CRLiss and PKCiss if CRLiss or PKCiss is more recent than the currently stored date, wherein the PKCiss is the issuance time of the PKC, where the passive display displays the lesser of CRLexp and PKCexp and displays a countdown initiated by the timer of fixed duration, where the user-controlled input is configured to activate before the countdown by the timer ends if the displayed time-stamp, namely the lesser of CRLexp and PKCexp, is in the future; and where the processor detects activation of the user-controlled input and allows communication with the reader, otherwise automatically aborts communication with the reader if activation of the user-controlled input is not detected before the countdown by the timer ends.

3. The device of claim 2 further comprising a user-controlled rejection input and where the processor aborts communication with the reader if the user activates the user-controlled rejection input.

* * * * *